(12) United States Patent
Martin et al.

(10) Patent No.: US 8,781,964 B2
(45) Date of Patent: Jul. 15, 2014

(54) SMART SAFE FOR MULTIPLE USERS

(75) Inventors: Rosemary B. Martin, Tampa, FL (US);
Felix A. Mon, Jacksonville, FL (US)

(73) Assignee: Bank of America Corporation,
Charlotte, NC (US)

( * ) Notice: Subject to any disclaimer, the term of this patent is extended or adjusted under 35 U.S.C. 154(b) by 265 days.

(21) Appl. No.: 12/683,061

(22) Filed: Jan. 6, 2010

(65) Prior Publication Data

US 2011/0167000 A1     Jul. 7, 2011

(51) Int. Cl.
| | |
|---|---|
| G06Q 40/00 | (2012.01) |
| G06Q 40/02 | (2012.01) |
| G06Q 20/18 | (2012.01) |
| G07F 19/00 | (2006.01) |
| G06Q 20/40 | (2012.01) |
| G06Q 20/10 | (2012.01) |

(52) U.S. Cl.
CPC .............. *G07F 19/202* (2013.01); *G06Q 40/02* (2013.01); *G06Q 20/18* (2013.01); *G06Q 20/40* (2013.01); *G06Q 20/1085* (2013.01)
USPC .......................................................... 705/43

(58) Field of Classification Search
USPC .......................................................... 705/43
See application file for complete search history.

(56) References Cited

U.S. PATENT DOCUMENTS

| | | | |
|---|---|---|---|
| 5,813,510 A * | 9/1998 | Rademacher | 235/379 |
| 6,796,415 B2 * | 9/2004 | Angove et al. | 194/206 |
| 7,229,009 B1 * | 6/2007 | Parsons et al. | 235/379 |
| 2002/0128969 A1 * | 9/2002 | Parmelee et al. | 705/42 |
| 2003/0179290 A1 * | 9/2003 | Frazzitta et al. | 348/61 |

OTHER PUBLICATIONS

Global training and education: An examination of context, cultural toughness, and minimum necessary change in internationally diverse organizational settings Dennis, Leslie E Edwin. Loyola University of Chicago, ProQuest, UMI Dissertations Publishing, 1967. 9715228.*
The world system in transition: Information technology and transnational banking Al-Muhanna, Ibrahim A. The American University, ProQuest, UMI Dissertations Publishing, 1987. 8806460.*
An empirical analysis of the impact of cost strategies and regulatory environment on the performance of the community bank in Nebraska Spagnola, Robert G. The University of Nebraska—Lincoln, ProQuest, UMI Dissertations Publishing, 1989. 9023002.*

* cited by examiner

*Primary Examiner* — Hani M Kazimi
*Assistant Examiner* — Hatem M Ali
(74) *Attorney, Agent, or Firm* — Michael A. Springs (57) ABSTRACT

In some embodiments, a method for processing a safe transaction includes receiving at a safe a first deposit of currency from a first user. Identification information is received from the first user. The identification information identifies the first user, an amount of the first deposit, and an account of the first user with a first financial institution. Transaction information is transmitted to the first financial institution. The transaction information provides information to the first financial institution of the first deposit to facilitate the first financial institution crediting the account of the first user.

20 Claims, 4 Drawing Sheets

SMART SAFE FOR MULTIPLE USERS

TECHNICAL FIELD

The present disclosure relates generally to a safe and more specifically to a smart safe for multiple users.

BACKGROUND

A safe is a device for securing valuable objects. For example, a safe may protect valuable objects against theft or damage. One example of a valuable object is a financial instrument, such as currency.

SUMMARY

In some embodiments, a method for processing a safe transaction includes receiving at a safe a first deposit of currency from a first user. Identification information is received from the first user. The identification information identifies the first user, an amount of the first deposit, and an account of the first user with a first financial institution. Transaction information is transmitted to the first financial institution. The transaction information provides information to the first financial institution of the first deposit to facilitate the first financial institution crediting the account of the first user.

Certain embodiments of the invention may provide one or more technical advantages. A technical advantage of one embodiment may include the capability to allow multiple users to use a safe. Another technical advantage of one embodiment may include the capability to maintain custody and control of deposited funds by multiple users to a common safe on an individual account level. Yet another technical advantage of one embodiment may include the capability to maintain the integrity of an individual user's deposits without necessarily physically separating the deposited funds.

Various embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure and its advantages, reference is now made to the following description taken in conjunction with the accompanying drawings, in which.

DETAILED DESCRIPTION

It should be understood at the outset that, although example implementations of embodiments of the invention are illustrated below, the present invention may be implemented using any number of techniques, whether currently known or not. The present invention should in no way be limited to the example implementations, drawings, and techniques illustrated below. Additionally, the drawings are not necessarily drawn to scale.

A safe is a device for securing valuable objects. In one example, a user may store financial instruments, such as currency, in the safe. The user may contract with a carrier service, such as an armored car service, to empty the safe for processing.

In this example, the carrier service picks up the currency, verifies the currency deposit for correctness and bills for authentication, and arranges for the currency to be deposited with a financial institution. A financial institution may include any individual, business, or organization that engages in banking activities, such as maintaining accounts (e.g., transaction accounts, or savings accounts), receiving deposits, crediting accounts, debiting accounts, and extending credit to account holders. In this example, the service carrier may not physically deliver the currency to the financial institution; rather, the financial institution may credit an account of the user without immediately receiving the physical currency.

A carrier service may include any individual, business, or organization that engages in activities including emptying safes. For example, the carrier service may empty the safe periodically and arrange for the contents of the safe to be deposited with a third party.

However, in the above example, a single user deposits currency in a single safe. If a second user were to deposit currency in the safe, the second user's currency would be mixed with the first user's currency. Accordingly, teachings of certain embodiments recognize the ability to provide a smart safe for multiple users.

Figure 1:
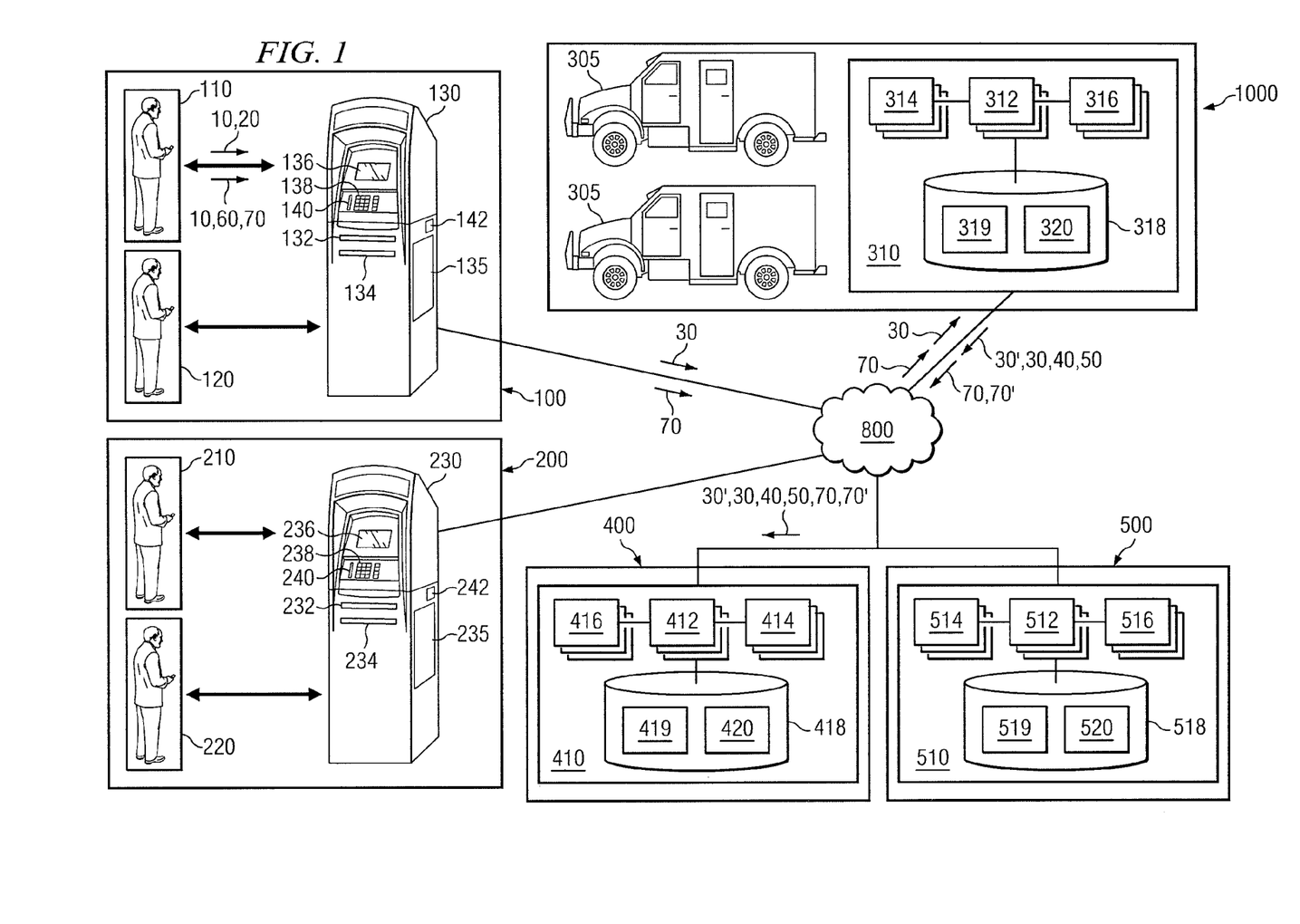
FIG. 1 shows a safe transaction system according to one embodiment.

FIG. 1 shows a safe transaction system 1000 according to one embodiment. In operation, system 1000 processes transactions between and among site 100, site 200, carrier service 300, financial institution 400, and financial institution 500.

In the illustrated example, system 1000 includes site 100, which includes users 110 and 120 and safe 130, and site 200, which includes users 210 and 220 and safe 230. Sites 100 and 200 may represent any physical location, including any location remote from financial institutions 400 and 500.

In one example embodiment, site 100 is a retail location, and users 110 and 120 are retailers located at the retail location. For example, user 110 may be a gas station, and user 120 may be a restaurant sharing a location with the gas station. In this example, the gas station and the restaurant are different business entities, and they may not share employees, bank accounts, and/or financial institutions 400 and 500.

In another example embodiment, site 200 is an office complex, and users 210 and 220 are tenants of the office complex. For example, user 210 may be a dentist, and user 220 may be a ticket office. In this example, the dentist and the ticket office are different business entities, and they may not share employees, bank accounts, and/or financial institutions 400 and 500.

Users 110, 120, 210 and 220 may include any individual, group of individuals, entity, machine, and/or mechanism authorized to deposit objects in a safe. Examples of user 110, 120, 210, or 220 may include, but are not limited to, a store owner, executive, manager, cashier, salesperson, accountant, engineer, technician, contractor, agent, employee, and/or any suitable user with authorization to deposit objects in a safe.

Safe 130 represents a device operable to receive and secure valuable objects. In the illustrated embodiment, safe 130 includes a receiving unit 132, a dispensing unit 134, a storage unit 135, a display 136, a keypad 138, and a card reader 140.

Receiving unit 132 may include any suitable device for receiving currency from a user, such as user 110 or user 120, and transmitting the currency to a storage unit, such as storage unit 135. One example of receiving unit 132 is a cash scanner operable to receive currency and scan information off of the currency. Dispensing unit 134 may include any suitable device for dispensing currency to a user, such as user 110 or user 120, from a storage unit, such as storage unit 135. Storage unit 135 may include any suitable device for storing currency. In some embodiments, storage unit 135 includes a locking mechanism. This locking mechanism may prohibit access to storage unit 135; for example, in some embodiments, the locking mechanism prohibits users 110 and 120 from accessing storage unit 135. In some embodiments, the locking mechanism allows carrier service 300 to access storage unit 135.

Display 136 may include any suitable device for displaying information to a user, such as user 110 or user 120. Examples of display 136 includes a Cathode Ray Tube (CRT), a Liquid Crystal Display (LCD), a Plasma Display Panel (PDP), a projector, and a touch screen display. Keypad 138 may include any device suitable for receiving information from user 110 or user 120. Examples of keypad 138 include a keyboard, mouse, or touchscreen.

Card reader 140 may include any device suitable for reading an electronic card. As one non-limiting example, card reader 140 may be operable to read the magnetic strip off a debit card or credit card. For example, in one embodiment, safe 130 identifies user 110 by reading a debit card through card reader 140. In this example, safe 130 may authenticate user 110 by accepting a personal identification number (PIN) through keypad 138.

Computing system 142 may include any suitable components for receiving, processing, and transmitting information related to operations of safe 130. Computing system 142 may couple to receiving unit 132, dispensing unit 134, display 136, keypad 138, and/or card reader 140. One example of computing system 142 includes the computing system 2000 shown in FIG. 2.

Safe 230 represents a device operable to receive and secure valuable objects. In the illustrated embodiment, safe 230 features a receiving unit 232, a dispensing unit 234, a storage unit 235, a display 236, and a keypad 238.

Receiving unit 232 may include any suitable device for receiving currency from a user, such as user 110 or user 220, and transmitting the currency to a storage unit, such as storage unit 235. One example of receiving unit 232 is a cash scanner operable to receive currency and scan information off of the currency. Dispensing unit 234 may include any suitable device for dispensing currency to a user, such as user 210 or user 220, from a storage unit, such as storage unit 235. Storage unit 235 may include any suitable device for storing currency. In some embodiments, storage unit 235 includes a locking mechanism. This locking mechanism may prohibit access to storage unit 235; for example, in some embodiments, the locking mechanism prohibits users 210 and 220 from accessing storage unit 235. In some embodiments, the locking mechanism allows carrier service 300 to access storage unit 235.

Display 236 may include any suitable device for displaying information to a user, such as user 210 or user 220. Examples of display 236 includes a Cathode Ray Tube (CRT), a Liquid Crystal Display (LCD), a Plasma Display Panel (PDP), a projector, and a touch screen display. Keypad 238 may include any device suitable for receiving information from user 210 or user 220. Examples of keypad 238 include a keyboard, mouse, or touchscreen.

Card reader 240 may include any device suitable for reading an electronic card. As one non-limiting example, card reader 240 may be operable to read the magnetic strip off a debit card or credit card. For example, in one embodiment, safe 230 identifies user 210 by reading a debit card through card reader 240. In this example, safe 230 may authenticate user 210 by accepting a personal identification number (PIN) through keypad 238.

Computing system 242 may include any suitable components for receiving, processing, and transmitting information related to operations of safe 230. Computing system 242 may couple to receiving unit 232, dispensing unit 234, display 236, keypad 238, and/or card reader 240. One example of computing system 242 includes the computing system 2000 shown in FIG. 2.

Carrier service 300 may include any individual, business, or organization that engages in activities including retrieving objects from a safe. In operation, carrier service 300 empties safes 100 and/or 200.

In some embodiments, carrier service 300 includes a plurality of carrier vehicles 305 and a carrier service system 310. Carrier vehicles 305 may include any vehicles suitable for transporting the contents of safes 130 and 230. One example of a carrier vehicle 305 is an armored car. An armored car may include any vehicle secured to protect against robbery and/or hijacking.

Carrier system 310 may include any computer system operable to assist in the operations of carrier service 300, such as verifying and authenticating currency and facilitating communications between safes 130 and 230 and financial institutions 400 and 500. Although the embodiment shown provides one example of carrier system 310 that may be used with other embodiments, such other embodiments may additionally utilize computers other than carrier system 310. Additionally, embodiments may also employ multiple carrier systems 310 or other computers networked together in a computer network. Multiple carrier systems 310 or other computers may be networked through the Internet and/or in a client-server network. Embodiments of the invention may also be used with a combination of separate computer networks each linked together by a private or a public network.

Carrier system 310 may include processors 312, input/output devices 314, network interfaces 316, and memory 318. In other embodiments, carrier system 310 may include more, less, or other components.

Processors 312 represent devices operable to execute logic contained within a medium. Examples of processor 312 include one or more microprocessors, one or more applications, and/or other logic. Carrier system 310 may include one or multiple processors 312.

Input/output devices 314 may include any device or interface operable to enable communication between carrier system 310 and external components, including communication with a user or another system. Example input/output devices 314 may include, but are not limited to, a mouse, keyboard, display, and printer.

Network interfaces 316 are operable to facilitate communication between carrier system 310 and other components within system 1000. Network interfaces 316 may connect to any number and combination of wireline and/or wireless networks suitable for data transmission. Network interfaces 316 may, for example, communicate internet protocol packets, frame relay frames, asynchronous transfer mode cells, and/or other suitable information between network addresses. Network interfaces 316 connect to a computer network or a variety of other communicative platforms including, but not limited to, a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable network interfaces; or any combination of the preceding. In one example embodiment, network interfaces 316 may connect to one or more networks 800 of FIG. 1.

Memory 318 represents any suitable storage mechanism and may store any information for use by carrier service 300 and carrier system 310. Memory 318 may comprise one or more tangible, computer-readable, and/or computer-executable storage medium. Examples of memory 318 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

In some embodiments, memory 318 stores logic 319. Logic 319 facilitates operation of carrier system 310. Logic 319 may include hardware, software, and/or other logic. Logic 319 may be encoded in one or more tangible media and may perform operations when executed by a computer. Logic 319 may include a computer program, software, computer executable instructions, and/or instructions capable of being executed by carrier system 310. Example logic 319 may include any of the well-known OS2, UNIX, Mac-OS, Linux, and Windows Operating Systems or other operating systems. In particular embodiments, the operations of the embodiments may be performed by one or more computer readable media storing, embodied with, and/or encoded with a computer program and/or having a stored and/or an encoded computer program. Logic 319 may also be embedded within any other suitable medium without departing from the scope of the invention.

In some embodiments, carrier service 300 stores carrier service information 320. Carrier service information 320 may include any information received or used during the processing of information from safe 130, safe 230, financial institution 400, and/or financial institution 500. One example of carrier service information 320 includes safe information 2020 received from safe computing system 2000, as described below with regards to FIG. 2.

Financial institutions 400 and 500 may include any individual, business, or organization that engages in banking activities. Examples of banking activities include maintaining accounts (e.g., transaction accounts, or savings accounts), receiving deposits, crediting accounts, debiting accounts, and extending credit to account holders.

In the illustrated embodiment, financial institution 400 includes a banking system 410. Banking system 410 may represent any computer system operable to assist in the operations of financial institution 400, such as maintaining account profile data 420 and communicating with safes 130 and 230 or carrier service 300. Although the embodiment shown provides one example of banking system 410 that may be used with other embodiments, such other embodiments may additionally utilize computers other than the banking system 410. Additionally, embodiments may also employ multiple banking system 410 or other computers networked together in a computer network. Multiple banking system 410 or other computers may be networked through the Internet and/or in a client-server network. Embodiments of the invention may also be used with a combination of separate computer networks each linked together by a private or a public network.

Banking system 410 may include processors 412, input/output devices 414, network interfaces 416, and memory 418. In other embodiments, banking system 410 may include more, less, or other components. Similarly, in the illustrated embodiment, financial institution 500 includes a banking system 510. Banking system 510 may include components similar to banking system 410, such as processors 512, input/output devices 414, network interfaces 416, and memory 418. In other embodiments, banking system 510 may include more, less, or other components.

Processors 412 and 512 represent devices operable to execute logic contained within a medium. Examples of processor 412 include one or more microprocessors, one or more applications, and/or other logic. Banking systems 410 and 510 may include one or multiple processors 412 and 512, respectively.

Input/output devices 414 and 514 may include any device or interface operable to enable communication between banking system 410 and 510, respectively, and external components, including communication with a user or another system. Example input/output devices 414 and 514 may include, but are not limited to, a mouse, keyboard, display, and printer.

Network interfaces 416 and 516 are operable to facilitate communication between banking system 410 and 519, respectively, and other components within system 1000. Network interfaces 416 and 516 may connect to any number and combination of wireline and/or wireless networks suitable for data transmission. Network interfaces 416 and 516 may, for example, communicate internet protocol packets, frame relay frames, asynchronous transfer mode cells, and/or other suitable information between network addresses. Network interfaces 416 and 516 may connect to a computer network or a variety of other communicative platforms including, but not limited to, a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable network interfaces; or any combination of the preceding. In one example embodiment, network interfaces 416 and 516 may connect to one or more networks 800.

Memory 418 and 518 represents any suitable storage mechanism and may store any information for use by financial institution 400 and banking system 410 and financial institution 500 and baking system 510, respectively. Memory 418 and 518 may comprise one or more tangible, computer-readable, and/or computer-executable storage medium. Examples of memory 418 and 518 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

In some embodiments, memory 418 stores logic 419. Similarly, in some embodiments, memory 518 stores logic 519. Logic 419 and 519 may include hardware, software, and/or other logic. Logic 419 and 519 may be encoded in one or more tangible media and may perform operations when executed by a computer. Logic 419 and 519 may include a computer program, software, computer executable instructions, and/or instructions capable of being executed by banking system 410 and banking system 510, respectively. Example logic 419 and 519 may include any of the well-known OS2, UNIX, Mac-OS, Linux, and Windows Operating Systems or other operating systems. In particular embodiments, the operations of the embodiments may be performed by one or more computer readable media storing, embodied with, and/or encoded with a computer program and/or having a stored and/or an encoded computer program. Logic 419 and 519 may also be embedded within any other suitable medium without departing from the scope of the invention.

In some embodiments, memory 418 stores account profile data 420, and memory 518 stores account profile data 520. Account profile data 420 and 520 may include any suitable data regarding an account, including, but not limited to, account number, account balance, transaction history, and transaction status. In one embodiment, account profile data 420 and 520 include information received or used during the processing of information from safe 130, safe 230, and/or carrier service 300. One example of account profile data 420 and 520 include safe information 2020 received from safe computing system 2000, as described below with regard to FIG. 2.

Network 800 represents any suitable network operable to facilitate communications between the components of system 1000, such as site 100, site 200, carrier service 300, financial system 400, and/or financial system 500. Examples of network 800 include a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable network interfaces; or any combination of the preceding.

Modifications or additions may be made to system 1000 without departure from the scope of the invention. For example, system 1000 may include more, fewer, or other sites, carrier services, and financial institutions that operate in any suitable capacity. As another example, financial institutions 400 and/or 500 may include a carrier service, such as carrier service 300, rather than carrier service 300 being a separate entity. As yet another example, safe 130 may communicate with carrier service 300 through a direct connection, i.e., not over a network 800 shared by financial institutions 400 and 500.

In operation, system 1000 processes transactions between and among site 100, site 200, carrier service 300, financial institution 400, and financial institution 500.

In an exemplary embodiment, safe 130 receives a deposit 10 and identification information 20 from user 110. In one embodiment, safe 130 receives deposit 10 through receiving unit 132. Deposit 10 includes currency, which may include any financial instrument. Examples of currency include coins or banknotes of a particular currency, such as a U.S. dollar.

Identification information 20 may include any information identifying user 110, financial institution 400, and/or deposit 10 to safe 130. Examples of identification information include information identifying and/or authenticating user 110 (e.g., an account number, a personal identification number (PIN), user card information, employee identification number) and information identifying regarding deposit 10 (e.g., deposit amount, instructions to safe 130). In some embodiments, safe 130 receives identification information 20 through keypad 138 and/or card reader 140. However, teachings of certain embodiments recognize that safe 130 may receive identification information 20 in any suitable manner. For example, in one embodiment, safe 130 receives identification information 20 regarding the amount of deposit 10 through receiving unit 132.

After receiving deposit 10 and/or identification information 20, safe 130 transmits transaction information 30 to financial institution 400. Transaction information 30 may include any information regarding user 110, deposit 10, and/or identification information 20. One example of transaction information 30 includes information, such as deposit amount and account number, that facilitates financial institution 400 crediting an account of user 110.

Financial institution 400 credits an account of user 110. For example, financial institution 400 credits the account of user 110 by the amount of deposit 10. In one embodiment, financial institution 400 updates account profile data 420 based on transaction information 30 or batched deposit 30'. In some embodiments, financial institution 400 issues a temporary credit to the account of user 110. This temporary credit may become permanent once deposit 10 is verified. In other embodiments, financial institution 400 issues a permanent credit to the account of user 110.

In this exemplary embodiment, carrier service verifies deposit 10 by determining whether the actual amount of currency in safe 130 matches the information from safe 130 and/or transaction information 30. If deposit 10 is verified, financial institution 400 receives confirmation 40. In the illustrated embodiment, carrier service 300 generates confirmation 40 and transmits confirmation 40 to financial institution 400.

If deposit 10 is out of balance, financial institution 400 receives adjustment information 50. In the illustrated embodiment, carrier service 300 generates adjustment information 50 and transmits adjustment information 50 to financial institution 400. Adjustment information 50 may include any information that notifies financial institution 400 of the verified amount of deposit 10. For example, if identification information represents that deposit 10 is in the amount of one hundred dollars, but deposit 10 only includes fifty dollars, then financial institution 400 would receive adjustment information 50 notifying financial institution 400 of the verified amount of deposit 10. In one embodiment, financial institution 400 will adjust the credit to the account of user 110 or issue a follow-up credit or debit to offset the difference between the credit issued at step 3300 and the verified amount.

In another exemplary embodiment, user safe 130 receives a request 60 and identification information 70 from user 110. In this example, request 60 represents a request for currency from safe 130. In one embodiment, safe 130 receives request 60 through keypad 138 and/or card reader 140. Currency may include any financial instrument. Examples of currency include coins or banknotes of a particular currency, such as a U.S. dollar.

Identification information 70 may include any information identifying user 110, financial institution 400, deposit 10, and/or request 60 to safe 130. Examples of identification information 70 include information identifying and/or authenticating user 110 (e.g., an account number, a personal identification number (PIN), user card information, employee identification number) and information identifying regarding request 60 (e.g., request amount, instructions to safe 130). In some embodiments, safe 130 receives identification information 70 through keypad 138 and/or card reader 140.

In this exemplary embodiment, safe 130 transmits transaction information 80 to financial institution 400. Transaction information 80 may include any information regarding user 110, deposit 10, request 60, and/or identification information 80. One example of transaction information 80 includes information, such as request amount, deposit amount, and account number, that facilitates financial institution 400 crediting or debiting an account of user 110.

In this example, safe 130 dispenses currency to user 110 in response to request 60. In one example, safe 130 dispenses currency through dispensing unit 134. Financial institution 400 debits an account of user 110 held with financial institution 400. In one example, financial institution 400 debits the account of user 110 by the amount of the request 60.

Figure 2:
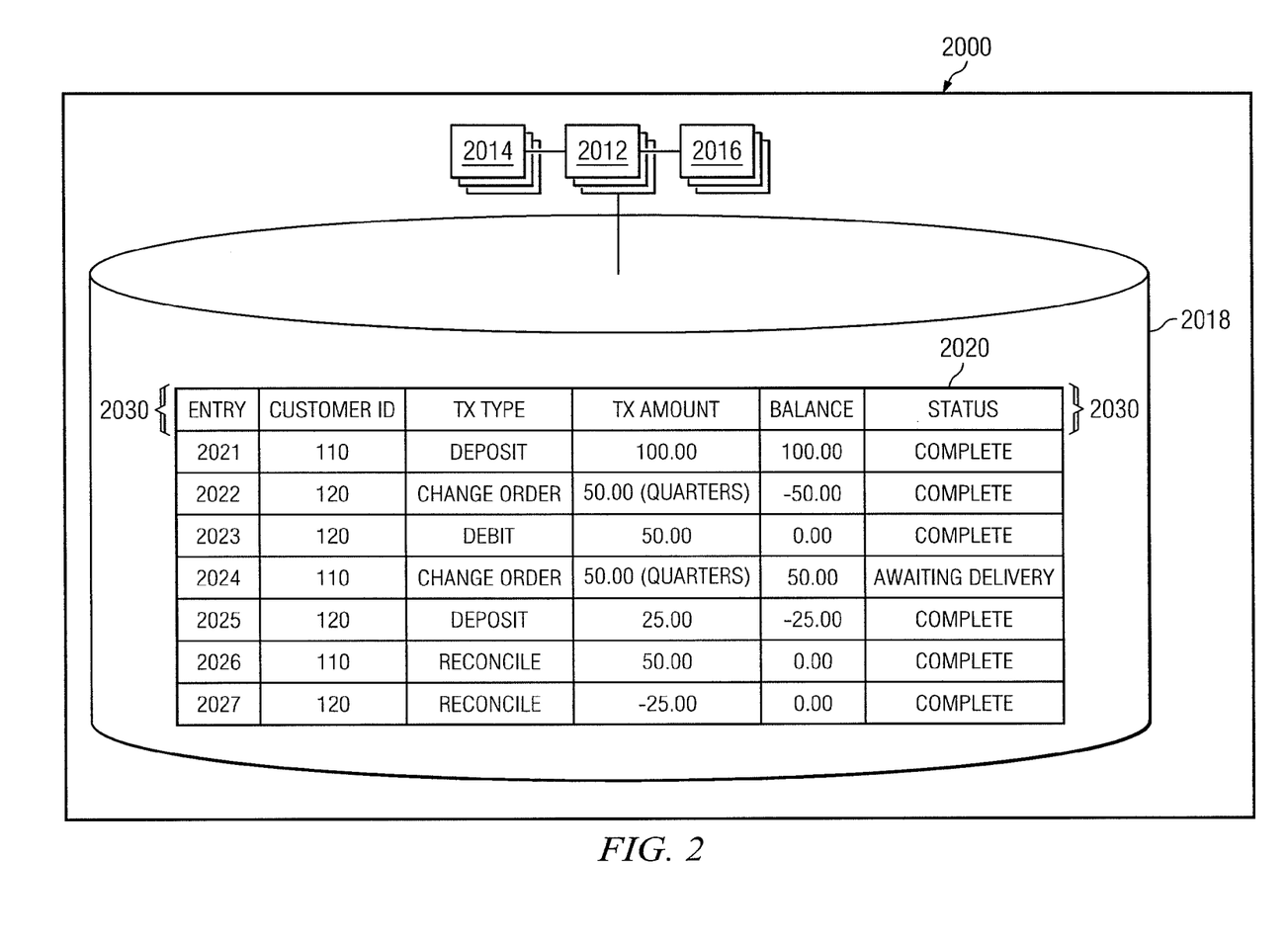
FIG. 2 shows computing system according to one embodiment.

FIG. 2 shows computing system 2000 according to one embodiment. Computing system 2000 may include any computer system operable to assist in the operations of safe 130 and safe 230, such as recording safe information 2020 and communicating with carrier service 300 and/or financial institutions 400 and 500. Although the embodiment shown provides one example of computing system 2000 that may be used with other embodiments, such other embodiments may additionally utilize computers other than the computing system 2000. Additionally, embodiments may also employ multiple computing systems 2000 or other computers networked together in a computer network. Multiple computing systems 2000 or other computers may be networked through the Internet and/or in a client-server network. Embodiments of the invention may also be used with a combination of separate computer networks each linked together by a private or a public network.

Computing system 2000 may include processors 2012, input/output devices 2014, network interfaces 2016, and memory 2018. In other embodiments, computing system 2000 may include more, less, or other components.

Processors 2012 represent devices operable to execute logic contained within a medium. Examples of processor 2012 include one or more microprocessors, one or more applications, and/or other logic. Computing system 2000 may include one or multiple processors 2012.

Input/output devices 2014 may include any device or interface operable to enable communication between computing system 2000 and external components, including communication with a user or another system. Example input/output devices 2014 include, but are not limited to, display 136, keypad 138, card reader 140, display 236, keypad 238, and card reader 240. Example input/output devices 2104 also include any other mouse, keyboard, display, and/or printer.

Network interfaces 2016 may be connected to any number and combination of wireline and/or wireless networks suitable for data transmission. Network interfaces 2016 may, for example, communicate internet protocol packets, frame relay frames, asynchronous transfer mode cells, and/or other suitable information between network addresses. Network interfaces 2016 may be connected to a computer network or a variety of other communicative platforms including, but not limited to, a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable network interfaces; or any combination of the preceding. In one example embodiment, network interfaces 2016 may be connected to one or more networks 800.

Memory 2018 represents any suitable storage mechanism and may store any information for use by safe 130 or safe 230. Memory 2018 may comprise one or more tangible, computer-readable, and/or computer-executable storage medium. Examples of memory 2018 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

In some embodiments, memory 2018 stores logic 2019. Logic 2019 may include hardware, software, and/or other logic. Logic 2019 may be encoded in one or more tangible media and may perform operations when executed by a computer. Logic 2019 may include a computer program, software, computer executable instructions, and/or instructions capable of being executed by computing system 2000. Example logic 2019 may include any of the well-known OS2, UNIX, MacOS, Linux, and Windows Operating Systems or other operating systems. In particular embodiments, the operations of the embodiments may be performed by one or more computer readable media storing, embodied with, and/or encoded with a computer program and/or having a stored and/or an encoded computer program. Logic 2019 may also be embedded within any other suitable medium without departing from the scope of the invention.

In some embodiments, memory 2018 stores safe information 2020. Safe information 2020 may include any information related to the processing of currency by safe 130 or safe 230. For example, safe information 2020 includes transaction entries 2021-2027 and data fields 2030. In the illustrated embodiment, data fields 2030 are for Customer ID, Transaction Type, Transaction Amount, Balance, and Transaction Status. Teachings of certain embodiments recognize that any other suitable safe information 2020 may be used and/or recorded.

In transaction entry 2021, user 110 deposits one hundred dollars, and the transaction status is completed. In this example, the transaction is completed once the deposit is received.

In transaction entry 2022, user 120 requests fifty dollars in quarters, and the transaction status is completed. In this example, the transaction is completed once the change order is delivered.

In transaction 2023, an account of user 120 is debited by fifty dollars. For example, user 120 may have an account with financial institution 400; in this example, information is transmitted to financial institution 400 to debit the account of user 120 by fifty dollars.

In transaction entry 2024, user 110 requests fifty dollars in quarters. However, in this example, the safe cannot dispense any more quarters because user 120 emptied the safe of quarters during transaction 2022. Therefore, the status of transaction entry 2024 is Awaiting Delivery because the safe is awaiting delivery of more quarters from carrier service 300 or any other provider of quarters. After transaction entry 2024, user 110 has a balance of fifty dollars.

In transaction entry 2025, user 120 deposits twenty five dollars, and the transaction has been completed. In this example, the transaction is completed once the deposit is received. After transaction entry 2025, user 120 has a balance of negative twenty five dollars. However, in other examples, balances are not carried at safe In transaction entries 2026 and 2027, computing system 2000 reconciles the balances of users 110 and 120 with their financial institutions. In one example, users 110 and 120 both maintain accounts with financial institution 400. In this example, safe computing system 2000 transmits reconciliation information based on transaction entries 2026 and 2027. Financial institution 400 receives the reconciliation information and updates the accounts of users 110 and 120.

Teachings of certain embodiments recognize that any suitable reconciliation method may be used. In one example embodiment, safe computing system 2000 reconciles open accounts once per a defined period, i.e., daily, weekly, or monthly. In another example embodiment, computing system 2000 reconciles each transaction as the transaction is completed. For example, in one embodiment, safe computing system 2000 transmits reconciliation information after transaction entry 2021 is complete.

Safe information 2020 may include any other suitable and relevant information not shown in FIG. 2. For example, the table illustrated in FIG. 2 may be linked to other tables. In one exemplary embodiment, safe information 2020 can use the Customer ID to look up a user's financial institution and account with the financial institution. In another exemplary embodiment, safe computing system 2000 can store additional details relating to the transaction, such as images and/or serial numbers of the currency deposited in or withdrawn from the safe. In yet another exemplary embodiment, safe computing system 2000 can use the Customer ID to look up additional user information, such as a PIN number, to confirm the identify of the user.

Figure 3:
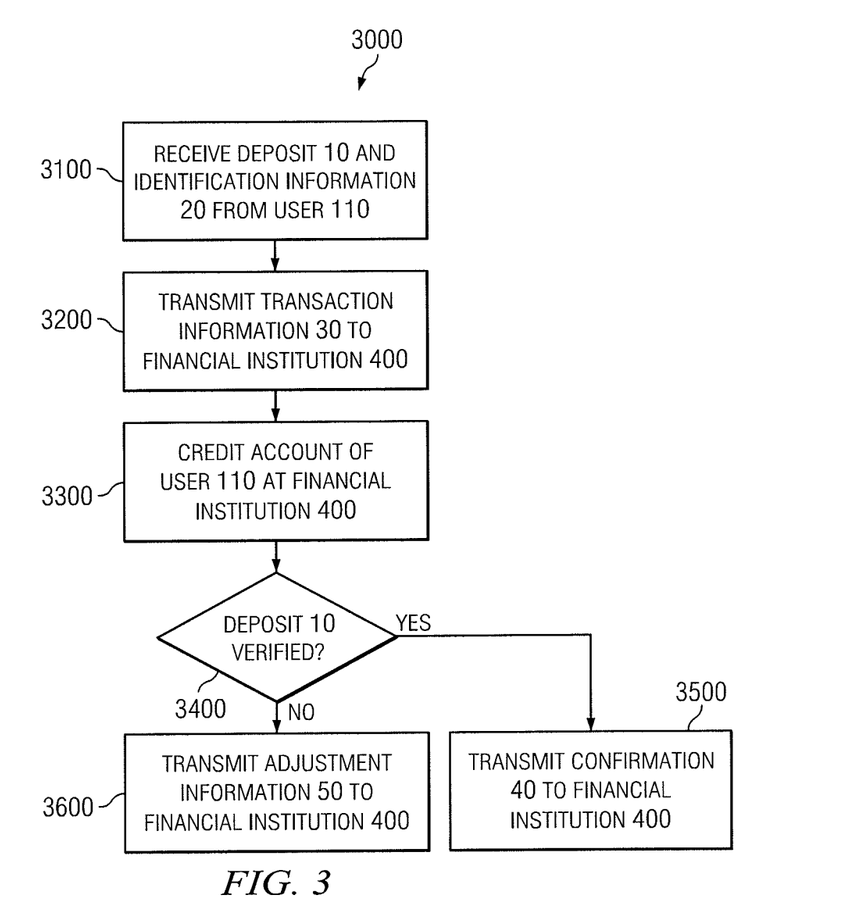
FIG. 3 shows a method for processing a safe transaction according to one embodiment.

FIG. 3 shows a method 3000 for processing a safe transaction according to one embodiment. At step 3100, safe 130 receives a deposit 10 and identification information 20 from user 110.

At step 3200, safe 130 transmits transaction information 30 to financial institution 400. In some embodiments, safe 130 transmits transaction information to carrier service 300, which processes transaction information 30 and transmits transaction information 30 to financial institution 400. One example of processing of transaction information 30 at carrier service 300 includes receiving multiple deposits 10, collecting the deposits 10 into a batched deposit 30', and transmitting batched deposit 30' to financial institution 400. Another example of processing transaction information 30 includes verifying and/or authenticating user 110, deposit 10, and/or identification information 20 prior to forwarding transaction information 30 to financial institution 400.

At step 3300, financial institution 400 credits an account of user 110. For example, financial institution 400 credits the account of user 110 by the amount of deposit 10. In one embodiment, financial institution 400 updates account profile data 420 based on transaction information 30 or batched deposit 30'.

In some embodiments, financial institution 400 issues a temporary credit to the account of user 110. This temporary credit may become permanent once deposit is verified. In other embodiments, financial institution 400 issues a permanent credit to the account of user 110.

At step 3400, carrier service verifies deposit 10 by determining whether the actual amount of currency in safe 130 matches the safe information 2020 and/or transaction information 30. In one embodiment, carrier service 300 collects the contents of storage unit 135 in carrier vehicles 305 and verifies the contents of storage unit 135 against safe information 2020 and/or transaction information 30. For example, if identification information 20 includes that deposit 10 is for an amount of fifty dollars, carrier service 300 verifies that user 110 actually deposited fifty dollars. In some embodiments, step 3400 may include verifying the authenticity of deposit 10. For example, in one embodiment, carrier service 300 verifies that deposit 10 did not include counterfeit bills.

In some embodiments, carrier service 300 verifies deposit 10 when collecting the contents of storage unit 135. However, teachings of certain embodiments recognize the capability to verify deposit 10 in any suitable manner. In one embodiment, deposit 10 may be verified remotely. As one example, receiving unit 132 may scan a serial number of the currency and/or scan an image of the currency, and the deposit 10 may be verified without physically inspecting the contents of storage unit 135.

If deposit 10 is verified, financial institution 400 receives confirmation 40 at step 3500. In the illustrated embodiment, carrier service 300 generates confirmation 40 and transmits confirmation 40 to financial institution 400. In one embodiment, if the credit to account of user 110 at step 330 is a temporary credit, then financial institution 400 will make the credit permanent after receiving confirmation at step 3500.

If deposit 10 is not verified, financial institution 400 receives adjustment information 50 at step 3600. In one embodiment, financial institution 400 will adjust the credit to the account of user 110 or issue a follow-up credit or debit to offset the difference between the credit issued at step 3300 and the verified amount from step 3400.

Figure 4:
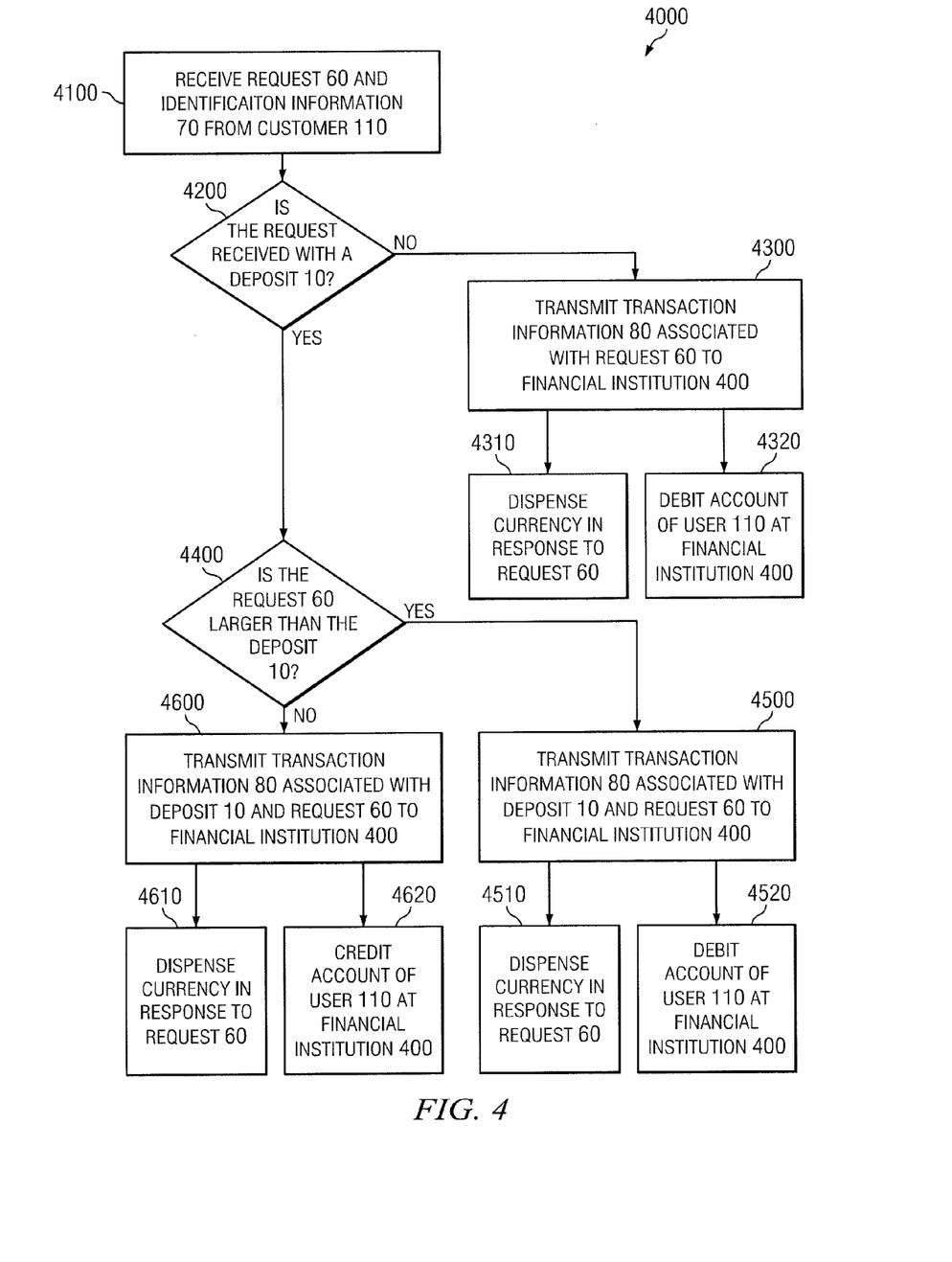
FIG. 4 shows a method for processing a safe transaction according to another embodiment.

FIG. 4 shows a method 4000 for processing a safe transaction according to another embodiment. At step 4100, safe 130 receives a request 60 and identification information 70 from user 110. In one embodiment, safe 130 receives request 60 through keypad 138 and/or card reader 140.

In some embodiments, request 60 is received in association with a deposit, such as deposit 10. In one exemplary embodiment, request 60 is a change order; for example, user 110 deposits fifty dollars in bills and requests fifty dollars in quarters.

Accordingly, at step 4200, safe 130 determines whether deposit 10 is received in association with request 60. If safe 130 does not receive deposit 10, then safe 130 transmits transaction information 80 to financial institution 400 at step 4300.

In some embodiments, safe 130 transmits transaction information 80 to carrier service 300, which processes transaction information 80 and transmits transaction information 80 to financial institution 400. One example of processing transaction information 80 at carrier service 300 includes receiving multiple deposits 10 and/or requests 60, collecting deposits 10 and/or requests 60 into a batched transaction 80', and transmitting batched transaction 80' to financial institution 400. Another example of processing of transaction information 80 includes verifying and/or authenticating user 110, deposit 10, request 60, and/or identification information 70 prior to forwarding transaction information 30 to financial institution 400.

In this example, if safe 130 does not receive deposit 10, then safe 130 dispenses currency to user 110 in response to request 60 at step 4310. In one example, safe 130 dispenses currency through dispensing unit 134. At step 4320, financial institution 400 debits an account of user 110 held with financial institution 400. In one example, financial institution 400 debits the account of user 110 by the amount of the request 60.

If safe 130 receives deposit 10 at step 4200, then the amount of request 60 is compared to the amount of deposit 10 at step 4400. If request 60 is for an amount larger than deposit 10, then safe 130 transmits transaction information 80 to financial institution 400 at step 4500. As explained above, in some embodiments, safe 130 transmits transaction information 80 to carrier service 300, which processes transaction information 80 and transmits transaction information 80 to financial institution 400.

In this example, if request 60 is for an amount larger than deposit 10, then safe 130 dispenses currency to user 110 in response to request 60 at step 4510. In one example, safe 130 dispenses currency through dispensing unit 134. At step 4520, financial institution 400 debits an account of user 110 held with financial institution 400. In one example, financial institution 400 debits the account of user 110 by the difference between the amount of the request 60 and the amount of deposit 10.

If request 60 is for an amount smaller than or equal to deposit 10, then safe 130 transmits transaction information 80 to financial institution 400 at step 4600. As explained above, in some embodiments, safe 130 transmits transaction information 80 to carrier service 300, which processes transaction information 80 and transmits transaction information 80 to financial institution 400.

In this example, if request 60 is for an amount smaller than deposit 10, then safe 130 dispenses currency to user 110 in response to request 60 at step 4610. In one example, safe 130 dispenses currency through dispensing unit 134. At step 4620, financial institution 400 credits an account of user 110 held with financial institution 400. In one example, financial institution 400 credits the account of user 110 by the difference between the amount of the request 60 and the amount of deposit 10. In another example, if request 60 is equal to deposit 10, then financial institution 400 does not credit or debit the account of user 110.

Methods 3000 and 4000 may include more, fewer, or different steps in any suitable order. As one example, method 4000 may include the additional steps of verification and transmitting confirmations 40 or adjustment information 50, as described with regards to steps 3400-3600 of FIG. 3. As another example, steps 4310, 4510, and 4610 recite dispensing currency in response to request 60. An additional step may include determining whether safe 135 has the funds necessary to dispense currency in response to request 60. For example, if request 60 is a request for fifty dollars in quarters, safe 135 needs fifty dollars in quarters. If safe 135 does not have fifty dollars on hand, then safe 135 may transmit a request for additional currency. In some embodiments, safe 135 transmits the request for additional currency to the carrier service 300; in response, the carrier service 300 would deliver fifty dollars in quarters to safe 135.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order. Additionally, operations of the systems and apparatuses may be performed using any suitable logic. As used in this document, "each" refers to each member of a set or each member of a subset of a set.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

What is claimed is:

1. A method for processing a safe transaction, comprising:
   receiving at a safe a first deposit of currency from a first user for deposit into an account of the first user with a first financial institution, wherein the first financial institution comprises a first carrier service;
   receiving, by a processor of the safe, identification information from the first user, the identification information identifying the first user, an amount of the first deposit, and the account of the first user with the first financial institution;
   transmitting, by a network interface of the safe, transaction information associated with the first deposit from the network interface of the safe directly to the first financial institution and the first carrier service, the transaction information providing information to the first financial institution of the first deposit to facilitate the first financial institution crediting the account of the first user;
   receiving at the safe a second deposit of currency from a second user for deposit into an account of the second user with a second financial institution different from the first financial institution, wherein the second financial institution comprises a second carrier service, the first carrier service and the second carrier service represent a service engaging in the retrieval of currency from the safe;
   receiving, by the processor of the safe, identification information from the second user, the identification information identifying the second user, an amount of the second deposit, and the account of the second user with the second financial institution different from the first financial institution; and
   transmitting, by the network interface of the safe, transaction information associated with the second deposit from the network interface of the safe directly to the second financial institution and the second carrier service, the transaction information providing information to the second financial institution of the second deposit to facilitate the second financial institution crediting the account of the second user;
   determining, by the processor of the safe, whether the first deposit of currency equals the identified amount of the first deposit; and
   if the first deposit of currency does not match the identified amount of the first deposit, transmitting, by the network interface of the safe, adjustment information to the first financial institution, the adjustment information providing information to the first financial institution regarding a verified amount of the first deposit of currency.

2. The method of claim 1, further comprising facilitating removal of the first deposit of currency from the safe after the determining that the first deposit of currency equals the identified amount of the first deposit.

3. The method of claim 1, wherein determining whether the first deposit of currency equals the identified amount of the first deposit comprises determining authenticity of the first deposit of currency.

4. The method of claim 1, further comprising:
   identifying each physical item of currency of the first deposit of currency;
   associating each physical item of currency with at least a part of the identification information from the first user; and
   storing the association in a memory.

5. The method of claim 1, further comprising:
   receiving a request for currency from the first user, the request for currency indicating a particular denomination of currency; and
   dispensing the denomination of currency to the first user in response to the request.

6. The method of claim 1, further comprising storing the first deposit and the second deposit in a secured compartment having a locking mechanism that allows access to the secured compartment by a carrier service.

7. A safe for multiple users, comprising:
   a currency receiver configurable to receive a first deposit of currency from a first user for deposit into an account of the first user with a first financial institution, wherein the first financial institution comprises a first carrier service, and a second deposit of currency from a second user for deposit into an account of the second user with a second financial institution, wherein the second financial institution comprises a second carrier service, the first carrier service and the second carrier service represent a service engaging in the retrieval of currency from the safe; and logic encoded on a computer readable storage medium such that, when executed by a processor, is configurable to:

receive identification information from the first user, the identification information identifying the first user, an amount of the first deposit, and the account of the first user with the first financial institution;

transmit transaction information associated with the first deposit directly to the first financial institution and the first carrier service, the transaction information providing information to the first financial institution of the first deposit to facilitate the first financial institution crediting the account of the first user;

receive identification information from the second user, the identification information identifying the second user, an amount of the second deposit, and the account of the second user with the second financial institution different from the first financial institution;

transmit transaction information associated with the second deposit directly to the second financial institution and the second carrier service, the transaction information providing information to the second financial institution of the second deposit to facilitate the second financial institution crediting the account of the second user; and transmit adjustment information to the first financial institution if the first deposit of currency does not equal the identified amount of the first deposit, the adjustment information providing information to the first financial institution regarding a verified amount of the first deposit of currency.

8. The safe of claim 7, the logic when executed further operable to transmit adjustment information to the first financial institution if the first deposit of currency does not equal the identified amount of the first deposit, the adjustment information providing information to the first financial institution regarding a verified amount of the first deposit.

9. The safe of claim 7, further comprising a secured compartment operable to store the first and second deposits of currency.

10. The safe of claim 9, the secured compartment further comprising a locking mechanism prohibiting access to the secured compartment by the first and second users and allowing access by a carrier service such that the carrier service:

determines whether the first deposit matches the identified amount of the first deposit; and if the first deposit of currency does not match the identified amount of the first deposit, transmits adjustment information to the first financial institution.

11. The safe of claim 9, the secured compartment further comprising a locking mechanism prohibiting access to the secured compartment by the first and second users and allowing access carrier service such that the carrier service:

determines authenticity of the first deposit of currency; and if the first deposit of currency is not authentic, transmits adjustment information to the first financial institution.

12. The safe of claim 7, the currency receiver further operable to identify each physical item of currency of the first deposit of currency, the logic when executed is further operable to associate each physical item of currency with at least a part of the identification information from the first user and store the association in a memory.

13. The safe of claim 7, the logic when executed further operable to receive a request for currency from the first user, the request for currency indicating a particular denomination of currency, the safe further comprising:

a currency dispenser operable to dispense the denomination of currency to the first user in response to the request.

14. A method for processing a safe transaction, comprising:

receiving at a safe a first request for currency from a first user, the first request for currency specifying denominations of currency;

receiving at the safe identification information from the first user, the identification information identifying the first user and an account of the first user with a first financial institution, wherein the first financial institution comprises a first carrier service, the first carrier service represents a service engaging in the retrieval of currency from the safe;

determining, by a processor of the safe, whether the first request for currency is for an amount larger than a first deposit of currency received in association with the first request for currency;

when the first request for currency is for an amount larger than the first deposit of currency, transmitting, by the processor of the safe, transaction information associated with the first request and the first deposit from the network interface of the safe directly to the first financial institution and the first carrier service, the transaction information providing information to the first financial institution of the first request and the first deposit to facilitate the first financial institution debiting the account of the first user; and dispensing the denominations of currency in response to the first request for currency.

15. The method of claim 14, further comprising:

receiving at the safe a second request for currency from a user, the second request for currency specifying denominations of currency; and when the second request for currency is for an amount smaller than a second deposit of unwanted currency received in association with the second request for currency, transmitting transaction information associated with the second request to the first financial institution, the transaction information providing information to the first financial institution of the second request and the second deposit to facilitate the first financial institution crediting the account of the user.

16. The method of claim 14, further comprising:

transmitting a request for currency to the first financial institution if the currency available in the safe is not greater than or equal to the first request for currency, the request requesting delivery of additional currency to the safe.

17. The method of claim 14, further comprising:

receiving at a safe a second request for currency from a second user, the second request for currency specifying denominations of currency;

receiving at the safe identification information from the second user, the identification information identifying the second user and an account of the second user with a second financial institution;

determining whether the second request for currency is for an amount larger than a second deposit of currency received in association with the second request for currency;

when the second request for currency is for an amount larger than the second deposit of currency, transmitting transaction information associated with the second request and the second deposit to the second financial institution, the transaction information providing information to the second financial institution of the second request and the second deposit to facilitate the second financial institution debiting the account of the second user;

receiving a third request for currency that is not received in association with a deposit of currency and transmitting transaction information associated with the third request to the second financial institution, the transaction information providing information to the second financial institution of the second request to facilitate the second financial institution debiting the account of the second user; and dispensing the denominations of currency in response to the second request for currency and the third request for currency.

18. The method of claim 17, further comprising storing the first deposit and the second deposit in a secured compartment having a locking mechanism that allows access to the secured compartment by a carrier service.

19. The safe of claim 9, the secured compartment further comprising a locking mechanism that allows access to the secured compartment by a carrier service.

20. The method of claim 14, further comprising:

receiving a second request for currency that is not received in association with a deposit of currency; and transmitting transaction information associated with the second request to the first financial institution, the transaction information providing information to the first financial institution of the second request to facilitate the first financial institution debiting the account of the first user.

* * * * *